United States Patent
Piccinini et al.

(10) Patent No.: US 8,645,371 B2
(45) Date of Patent: Feb. 4, 2014

(54) PERSONAL RESOURCES ORGANIZER WITH CALENDAR INTERFACE AND OBJECT DETECTION

(75) Inventors: Sandro Piccinini, Rome (IT); Luigi Pichetti, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/458,063

(22) Filed: Apr. 27, 2012

(65) Prior Publication Data

US 2012/0209868 A1    Aug. 16, 2012

Related U.S. Application Data

(63) Continuation of application No. 12/348,482, filed on Jan. 5, 2009, now Pat. No. 8,185,527.

(51) Int. Cl.
*G06F 17/30* (2006.01)

(52) U.S. Cl.
CPC .............................. *G06F 17/30867* (2013.01)
USPC ............. 707/732; 707/770; 707/802; 726/27

(58) Field of Classification Search
USPC ............. 707/669, 770, 782, 802, 732; 726/27
See application file for complete search history.

(56) References Cited

U.S. PATENT DOCUMENTS

| 5,813,539 | A | 9/1998 | DePalma | |
|---|---|---|---|---|
| 6,035,297 | A * | 3/2000 | Van Huben et al. | 707/781 |
| 6,094,654 | A * | 7/2000 | Van Huben et al. | 707/669 |
| 7,716,240 | B2 * | 5/2010 | Lim | 707/781 |
| 2005/0050061 | A1 | 3/2005 | Karstens | |
| 2010/0174759 | A1 | 7/2010 | Piccinini et al. | |
| 2010/0223287 | A1 | 9/2010 | Lim | |

OTHER PUBLICATIONS

U.S. Appl. No. 12/348,482.

* cited by examiner

*Primary Examiner* — Shahid Alam
(74) *Attorney, Agent, or Firm* — Stephen J. Walder, Jr.; Jeffrey S. LaBaw (57) ABSTRACT

A personal resources organizer with calendar interface and object detection is provided. The personal resources organizer monitors personal resources for use with a scheduled event by identifying one or more personal resource objects present in a container and retrieving a list of required personal resource objects for an event scheduled in an electronic schedule. The identified one or more personal resource objects are compared with the list of required personal resource objects for the schedule event and a report of a readiness for the scheduled event is generated based on results of the comparison. The report may then be output for use by a user in determining the user's readiness or preparedness for the scheduled event such that the user may make modifications to the personal resource objects in the container and/or the list or required personal resource objects.

20 Claims, 3 Drawing Sheets

| Event Identifer | | | | |
|---|---|---|---|---|
| Personal Resource ID | Description | Required Quantity | Required/Optional | Current Quantity |
| 420 | 430 | 440 | 450 | 460 |
| ⋮ | ⋮ | ⋮ | ⋮ | ⋮ |
| Personal Resource ID | Description | Required Quantity | Required/Optional | Current Quantity |
| Event Identifer | | | | |
| Personal Resource ID | Description | Required Quantity | Required/Optional | Current Quantity |
| ⋮ | ⋮ | ⋮ | ⋮ | ⋮ |

PERSONAL RESOURCES ORGANIZER WITH CALENDAR INTERFACE AND OBJECT DETECTION

This application is a continuation of application Ser. No. 12/348,482, filed Jan. 5, 2009, now U.S. Pat. No. 8,185,527.

BACKGROUND

The present application relates generally to an improved data processing apparatus and method and more specifically to a personal resources organizer with calendar interface and object detection.

With increased usage of computers in today's society, many people rely more heavily on these computers for organizational purposes. For example, many people look to electronic calendar programs, such as may be provided in Lotus Notes™ available from International Business Machines Corporation or Outlook™ available from Microsoft Corporation, to help organize their appointments, events, and the like. While these electronic calendar programs provide assistance in organizing, remembering, and alerting individuals to appointments and events in their lives, they do have limitations.

For example, in today's society people are much more mobile than in years gone by and often are involved in long distance travel, overseas travel, and the like, where items available at a person's home location are not necessarily available at the destinations to which they travel. Moreover, people run much more busy lives than just a decade ago and are constantly having to go from one event to the next. This is very much the case both in a business context and a personal context. With such an "on the go" society, people are continuously having to prepare for the events in their lives with regard to the items that they are taking with them. Because people's lives are so busy, it is often the case that something gets left behind and is not available when the person arrives at their destination, meeting, event, etc.

For example, in today's business world, people often must be involved in frequent travel and must, consequently, prepare their luggage for such travel. Moreover, people working at customer sites have certain materials that they will need at the customer site depending on the specific customer that they are visiting. As a further example, students often must bring specific books and materials to their classroom depending on the planned activities for the day, e.g., the particular classes that they will be attending. In all these cases, there is a need for the particular person to be personally organized such that they remember which items, materials, etc. to bring with them to the particular event, on the particular travel, or the like. Often people forget something in this process and arrive without the materials that they need to be productive at the destination.

While electronic calendar programs are very good at reminding people of the occurrence of an event, meeting, or the like, they do not have any ability to assist the individual with actually preparing for the event, meeting, etc. in terms of the items, materials, etc. that need to be brought with them.

SUMMARY

In one illustrative embodiment, a method, in a data processing system, is provided for monitoring personal resources for use with a scheduled event. The method comprises identifying one or more personal resource objects present in a container and retrieving a list of required personal resource objects for an event scheduled in an electronic schedule. The method further comprises comparing the identified one or more personal resource objects with the list of required personal resource objects and generating a report of a readiness for the scheduled event based on results of the comparison. Moreover, the method comprises outputting the report.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an automated personal resource organizer mechanism for informing a user of personal resources that the user needs to have with them for events occurring in the user's life. Moreover, the automated personal resource organizer mechanism tracks which personal resources the person actually has inserted into their transport containers, e.g., luggage, briefcase, travel bag, or the like, and the quantity of personal resources and dynamically updates reminders or alerts to the user to inform them of which personal resources still need to be inserted into the transport containers or where personal resources may be removed from the transport containers in order to reduce weight, utilized space, etc. To track or monitor the status of the personal resources in the transport containers, identifier tags may be associated with the personal resources with the transport container having a mechanism to read the identifier tags and report the information gathered from the read identifier tags to a computing device.

The automated personal organizer mechanism may interface with, and operate in conjunction with, an electronic calendar mechanism, such as an electronic calendar program running on the computing device, that stores information about the events in a user's life for some period of time. The events may have associated lists of personal resources, and associated quantities, that are either generically provided, specified by a user, or user modified from a generic list. Quantities may further be associated with a duration of the event, travel, or the like, with which the list is associated. These lists may be used to identify which personal resources still need to be included in the storage containers, which personal resources may be removed from the storage containers, and the like.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
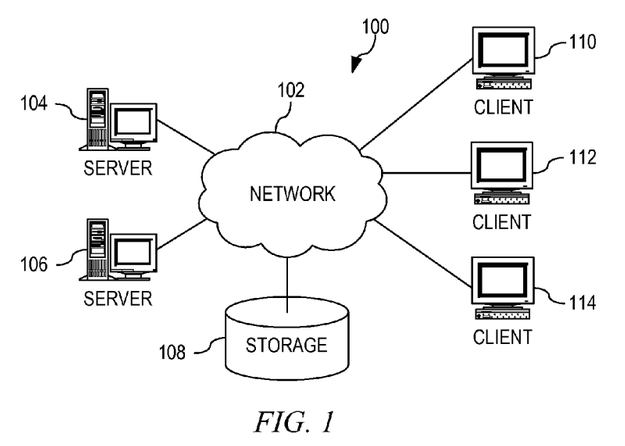
FIG. 1 is an example distributed data processing system in which aspects of the illustrative embodiments may be implemented.
Figure 2:
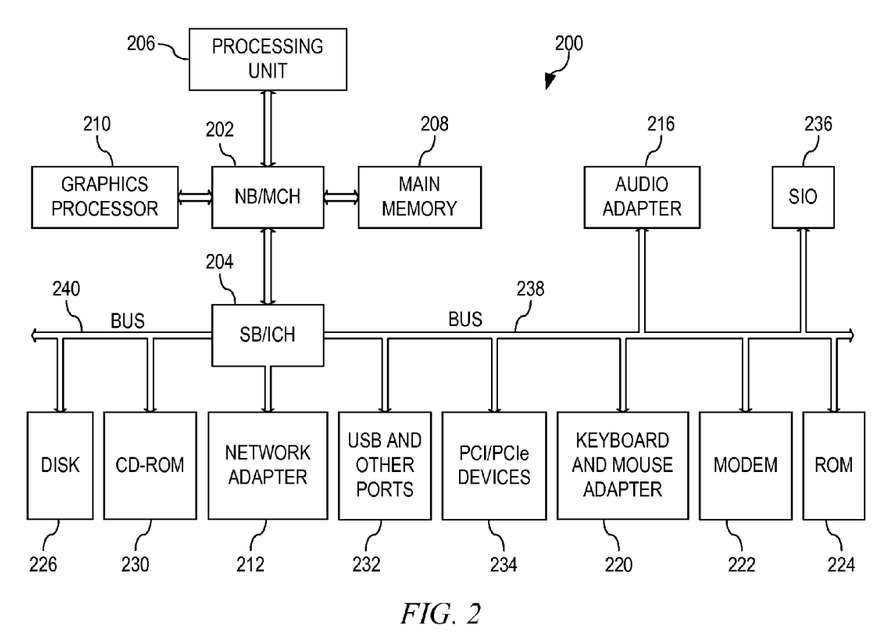
FIG. 2 is an example block diagram of a data processing device in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation this is only an example and is not intended to state or imply any limitation with regard to the features of the present invention. To the contrary, the illustrative embodiments are intended to include distributed data processing environments and any other embodiments in which personal resource storage containers may monitor the contents of the personal resource storage containers and report that information to a data processing system to thereby interface and utilize a personal resource management application which may operate in association with an electronic calendar application.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With reference again to FIG. 1, a data processing device, such as a client device 110 or server device 104, executes a personal resources management application in accordance with the illustrative embodiments. The personal resources management application provides a mechanism through which lists of personal resources may be associated with particular events scheduled in an associated calendar application on the data processing device or another data processing device, e.g., on another client device 112 or server 106. The lists may be pre-generated and general in nature, i.e. not specific to a particular user, may be user generated through an interface provided by the personal resources management application, or may be generated by user modification of a generic pre-established list. The lists may specify particular personal resources, associated quantities, and specific identifiers associated with the personal resources.

The personal resources included in the lists may be any type of object, material, or the like that a person may need to take with them to or on the event with which the list is associated. For example, the personal resources may be clothing, toiletries, business files, books, electronic devices, or any other physical item to which identifier tags may be attached, coupled, or otherwise associated. The physical versions of these personal resources have associated identifiers physically attached, coupled, or otherwise associated with them. In one illustrative embodiment, the personal resources have physically attached tags that are readable by a sensing device. These tags may take many different forms including barcode tags, radio frequency identifier (RFID) tags, or any other identifier tag that is able to be read or sensed by an appropriate reading or sensing device.

The storage containers for the personal resources preferably include a reader or sensing device that is capable of reading or sensing the presence of identifier tags associated with personal resources added to the contents of the storage containers. Again, in one illustrative embodiment, the storage containers may be luggage, briefcases, packing boxes, or the like. Integrated into these storage containers is the reader/sensing device. As the personal resources are inserted into the storage container, the associated reader/sensing device detects the presence of the personal resource by way of the identifier tag attached to the personal resource. For example, a RFID tag reader in a piece of luggage may detect the presence of a piece of clothing placed in the piece of luggage based on the RFID tag attached to the piece of clothing. The particular ID of the RFID tag, which is read or sensed by the RFID tag reader identifies the piece of clothing, or other personal resource, with the particular ID being reported back to the data processing system by the reader/sensing device in the storage container via a wired or wireless communication link, e.g., Ethernet, Bluetooth, wireless 802.11, or other type of communication link.

The data processing system, upon receiving the particular ID for the personal resource, e.g., a piece of clothing, that has been inserted into the storage container, determines if the personal resource's ID is part of an active list for an active event in the user's electronic calendar application. An active event may be an event whose start date is within a predetermined period of a current time or which has a reminder notification activation time within a predetermined period of a current time. For example, if the event is a travel event, e.g., a vacation or business travel, then the event in the electronic calendar application may be scheduled to be active one or more days prior to the actual day on which the travel is intended to start. The active start and end times may be associated with reminder time entries already set for the calendar entry.

If the personal resource's ID is associated with a personal resource in a list of personal resources for the active event, then a the list of personal resources is updated to reflect the addition of the personal resource to the storage container. The updating may include incrementing a count of a number of the personal resource presently in the storage container. Of course, as personal resources are removed from the storage container, such removal may also be detected by the reader/sensing device and communicated to the data processing system. Accordingly, the list of personal resources may be updated to reflect removal of the personal resource from the storage container by, for example, decrementing a count of the number of that personal resource in the list of personal resources. In this way, a dynamic inventory of the personal resources included in the storage container may be maintained.

If the particular personal resource detected by the reader/sensing device is not in the list associated with an active event, then the personal resource may be added to the list with an appropriate indicator that identifies the personal resource as not being essential to the event. Of course, as with other personal resources in the list, the count of the number of the personal resource in the storage container may be maintained even for personal resources that are not essential to the event and the addition/removal of such personal resources may be monitored using the reader/sensing device. Moreover, rather than only monitoring a single storage container for a single active event, the mechanisms described above may be used with any number of storage containers and any number of active events with correlation of detected personal resources with the various lists of personal resources for the active events.

The user may then obtain a report of the user's current status with regard to the list of personal resources for the active event. This report may be generated in response to a user input, for example, requesting that the report be generated. This report may further be automatically generated and output in response to a triggering condition, such as at a particular time prior to the event's start time or the like. The report may be generated and output on an output device associated with the data processing system, e.g., a display, through an audio adapter, or the like. Moreover, the report may be generated and transmitted to a pre-specified electronic device, e.g., a wireless telephone, laptop computer, personal digital assistant, or the like. The report may include alert messages for informing the user of discrepancies between the current set of personal resources in the container(s) and a required set of personal resources for the active event. These alerts may specify that a particular required personal resource is not present in the current set of personal resources, that the quantity of a particular personal resource does not match that which is required for the active event, that there are additional personal resources in the storage containers that are not required by the list of required personal resources for the active event, or the like. Moreover, the report may specify which storage containers the particular personal resources are in so that the user may quickly identify where changes in the current set of personal resources need and can be made.

Thus, the illustrative embodiments provide mechanisms for providing a personal resource organizer that interfaces with an electronic calendar application to help users organize the physical items that they need to take with them to scheduled events. The mechanisms of the illustrative embodiments provide for dynamically sensing/reading the presence, or lack thereof, of particular personal resources in storage containers and reporting that information to a data processing system. The data processing system may then compare such personal resources information with a list of required personal resources for active events and determine whether the user has inserted all of the required personal resources for the active event in a storage container, if additional personal resources have been inserted into the storage container that are not on the required list, and whether appropriate quantities of personal resources have been inserted into the storage container. The data processing system may then report its findings to the user so that the user may make appropriate modifications to the current set of personal resources that they have placed in the storage containers, if necessary, so as to make sure that all required personal resources are taken with them to the active event.

Figure 3:
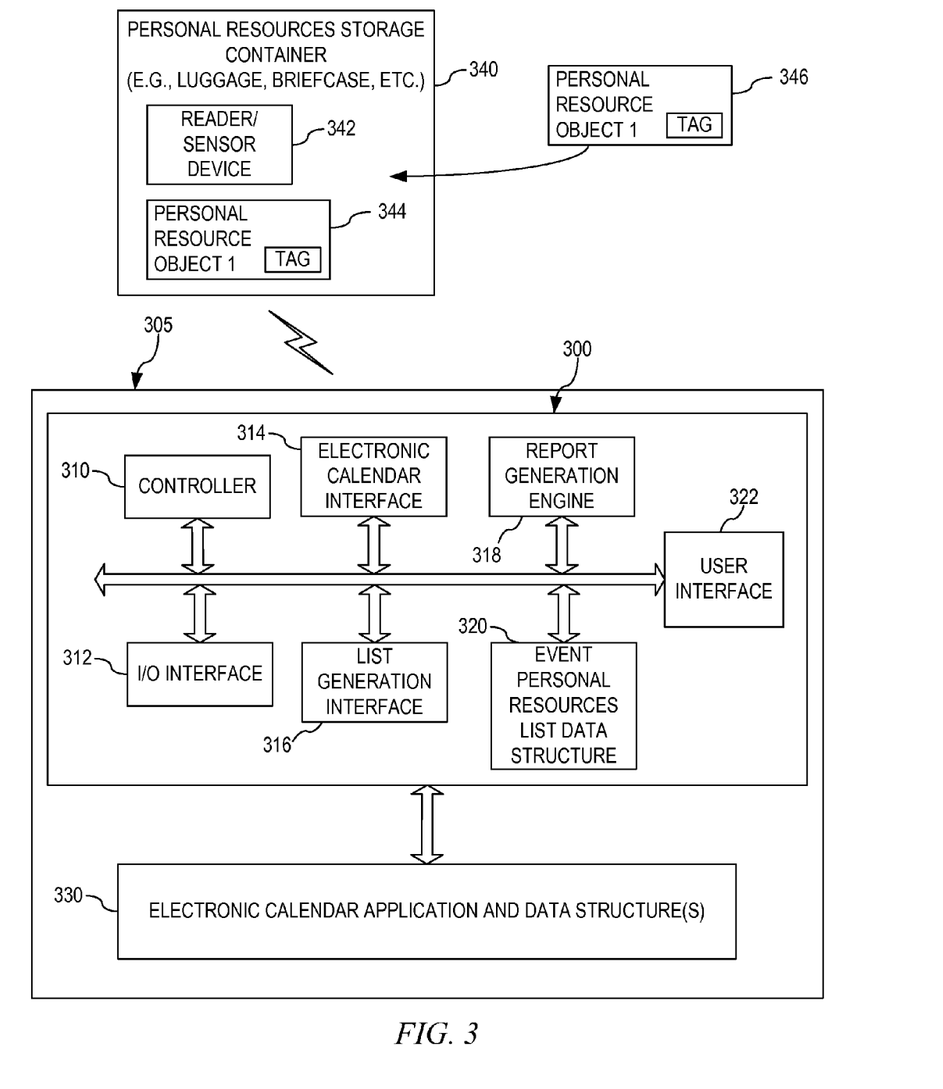
FIG. 3 is an example block diagram depicting an example operation of the primary components of a personal resources organizer mechanism in accordance with the illustrative embodiments.

FIG. 3 is an example block diagram depicting an example operation of the primary components of a personal resources organizer mechanism in accordance with the illustrative embodiments. As shown in FIG. 3, the personal resources organizer 300 of the illustrative embodiments comprises a controller 310, a input/output (I/O) interface 312, an electronic calendar interface 314, a personal resources list generation interface 316, a report generation engine 318, an event personal resources list data structure 320, and user interface 322. While the even personal resources list data structure 320 is shown as part of the personal resources organizer 300, it should be appreciated that this data structure may instead be stored in association with the electronic calendar application and data structure(s) 330. The elements 310-320 of the personal resources organizer 300 may be implemented as software, hardware, or any combination of software and hardware. In one illustrative embodiment, the elements 310-320 are implemented as software executing on one or more processors and/or data/instructions stored in one or more data storage devices.

The controller 310 controls the overall operation of the personal resources organizer 300 and orchestrates the operation of the other elements 312-322 with regard to the operations described herein. The input/output (I/O) interface 312 provides a communication pathway through which the personal resources organizer 300 may communicate with other data processing devices via direct connections, wireless connections, wired connections, or the like. For example, the I/O interface 312 may be used to communicate wirelessly with the personal resources storage container 340.

The electronic calendar interface 314 provides a communication pathway through which the personal resources organizer 300 may communicate with an electronic calendar application and data structure(s) 330. The electronic calendar interface 314 may provide such communication through a direct connection, one or more network connections, etc. which may be of a wired or wireless nature. In the depicted example, the electronic calendar application and data structure(s) 330 are executed in the same data processing system 305 as the personal resources organizer 300. However, it should be appreciated that the electronic calendar application and data structure(s) 330 may be provided on a different data processing system from that of the personal resources organizer 300 without departing from the spirit and scope of the illustrative embodiments.

The list generation interface 316 provides one or more user interfaces, e.g., graphical user interfaces or the like, through which a user may create, edit, and delete lists of personal resources and associate them with particular scheduled events in the user's electronic calendar application and data structure(s) 330. For example, a user may, via the user interface 322, select an event in the user's electronic calendar application 330 and bring up a graphical user interface, generated by the list generation interface 316, through which the user may select a pre-established list, edit an already created list, or create a new list for the selected event. Via this graphical user interface, the user may select particular personal resources, from a plurality of possible personal resources, to be included in the list of required personal resources for this selected event. In addition, the user may specify quantities of the required personal resources. Rather than selecting from a plurality of possible personal resources, fields may be provided through which a user may input identifier information for personal resources that are to be included in the list of required personal resources.

Moreover, the personal resources organizer 300 may automatically associated pre-defined lists of personal resources with scheduled events as they are scheduled in the electronic calendar application 330 and stored in the data structure(s). Such pre-defined lists, after having been associated with a particular scheduled event in the electronic calendar application 330, may be edited by the user via the list generation interface 316. Any manner by which a list of required personal resources may be generated either automatically or by a user and associated with a scheduled event is intended to be within the spirit and scope of the illustrative embodiments.

The event personal resources list data structure 320 stores the lists of required personal resources created and associated with scheduled events in the electronic calendar application and data structure(s) 330. The report generation engine 318 generates reports and alert messages based on the required personal resources lists for active events stored in the event personal resources list data structure 320. Such reports may be output via the user interface 322, the I/O interface 312, or the like, according to preferences established by the user with the controller 310. Such preferences may include an identification of an identifier of another device to which reports and alert messages are to be sent, e.g., a wireless telephone number of a wireless telephone to which reports and alerts are to be sent, etc. The reports may identify which personal resources have been placed in storage container 340, which personal resources have not been placed in the storage container 340, quantities of each personal resource in the storage container 340, which personal resources still need to be placed in the storage container 340, which personal resources can be removed from the storage container 340 to save space and weight, and the like.

The user interface 322 provides an interface through which a user may provide input and may receive output from the personal resources organizer 300. Thus, the user may provide input for establishing lists of required personal resources, requests for the generation of reports, and the like, via the user interface 322. Similarly, the user may receive reports and alert messages via the user interface 322 as well as be able to create, edit, and delete lists of required personal resources associated with scheduled events.

The personal resources storage container 340 may be any type of physical container 340 into which personal resource objects may be placed. For example, the personal resources storage container 340 may be a suitcase, a briefcase, a duffel bag, a trunk of a vehicle, an interior of a vehicle, or the like. The personal resources storage container 340 includes a reader/sensor device 342 that reads or senses identifier tags associated with personal resource objects, e.g., personal resource object 1 344, placed inside or in close proximity to the personal resources storage container 340. As the personal resource objects 344-346 are added to or removed from the personal resources storage container 340, the reader/sensor device 342 reads or senses the addition or removal by detecting the ID tags associated with personal resource objects 344-346 that are still present in the personal resources storage container 340.

In one illustrative embodiment, the reader/sensor device 342 may read/sense all of the personal resource objects currently in the personal resources storage container 340 when the personal resource storage container 340 is closed. That is, the reader/sensor device 342 may be coupled to a latching mechanism, a hinge, or other mechanism typically provided on a container which may indicate when the container is closed. In response to detected closure of the container 340, the reader/sensor device 342 may be initialized to perform an inventory scan or reading of the tags of personal resource objects 344 currently inside the container 340.

The reader/sensor device 342 preferably includes a wireless communication mechanism, e.g., a wireless transmitter, that transmits the ID values of the identifier tags detected by the reader/sensor device 342. Again, this transmission may be made in response to a personal resource object, e.g., personal resource object 2 346, being added to the personal resources storage container 340, being removed from the storage container 340, a closure of the container 340, or the like. The transmission may include, not only the ID value(s) of personal resource object(s) added to, removed from, or simply in the container 340, but may further include an identifier of the container 340 which may be pre-programmed into the reader/sensor device 340.

The transmission is received by the personal resources organizer 300 on data processing system 305 via the I/O interface 312, for example. The controller 310 receives the information included in the transmission and retrieves electronic calendar scheduled events from the electronic calendar application 330 via the electronic calendar interface 314. The scheduled events that are retrieved are preferably the currently active events. Again, a currently active event may be an event for which an activation condition has occurred, e.g., a notification time has occurred recently or is about to occur within a predetermined time period, the start time of the event itself is within a predetermined time period of the current time, or the like. The identity of the currently active events may be reported back to the controller 310 via the electronic calendar interface 314 in response to the request from the controller 310 for such information and then correlated with lists of required personal resources in the event personal resources list data structure 320, for example.

A corresponding list of required personal resources may be retrieved from the event personal resources list data structure 320 based on an identifier of the currently active events. This identifier may be an alphanumeric reference number automatically assigned to the event when it was created, a name of the event in a field of the event record in the electronic calendar data structure(s) 330, a combination of an event name, reference number, etc. and a date/time of the event, or the like. The identifier may be generic in nature such that it applies to a number of different reoccurring events in the electronic calendar or may be specific to a particular event at a particular date/time.

Once the lists of the currently active events are retrieved from the event personal resources list data structure 320, the ID values of the tags of the personal resource objects in the container 340 are compared against the currently active event lists of required personal resources and entries in the lists are updated accordingly to reflect which personal resource objects are currently present in the container 340. In some instances, new entries may be added for personal resource objects that are in the container but are not listed as a required personal resource. Fields within the entries are updated accordingly based on current quantities of personal resource objects in the container 340, whether the personal resource objects are required or not for the currently active event, which container 340 the personal resource objects are in, and the like. Again, while the example shows only one container 340, it should be appreciated that multiple containers 340 may be monitored using the mechanisms of the illustrative embodiments such that knowing which container a personal resource object is in may be beneficial. For example, it may be beneficial to a user to know whether a particular object is in their suitcase, their briefcase, or the trunk of their vehicle.

As mentioned above, the lists are updated and stored back to the event personal resources list data structure 320. At a later time a user may request, or a condition may be met resulting in an automatic generation of, a report of the current status of the user's personal resources with regard to a particular scheduled event. This report may be a report of the readiness of the user for the scheduled event. The report generation engine 318 may generate such a report from the list of required personal resources in the event personal resources list data structure 320 and present it to the user via the user interface 322 or it may be transmitted to a remote device via the I/O interface 312, for example. In addition, the report generation engine 318 may generate alerts regarding whether too many or too few personal resource objects of a particular type are currently in the container 340 for the scheduled event in order to bring the user's attention to this situation.

It should be noted that while the above illustrative embodiment is described in terms of updating the lists of required personal resources using the current contents of the container 340, a separate data structure may be maintained for each container 340 that stores the ID values of the objects currently present in the container 340. These data structures may then be compared to the list of required personal resources to determine whether the requirements set forth in the list of required personal resources are currently met or not by the contents of the container 340 and appropriate reports/alerts may be generated. In this way, the list of required personal resources is not modified unless the user specifically accesses the list via the list generation interface 316 to thereby edit the list of required personal resources.

Further, it should be noted that while the illustrative embodiments described above detect the removal of personal resource objects from the container 340, rather than actively detecting such removal, the illustrative embodiments may deduce the removal of a personal resource object by comparing the current contents of a container 340 to previous contents of the container 340 as previously reported by the reader/sensor device 342. Removal may be deduced by the personal resource object being present in a previous reporting from the reader/sensor device 342 and the personal resource object not being present in a current report from the reader/sensor device 342.

Moreover, it should be appreciated that while the illustrative embodiments are described in terms of an electronic calendar application 330, which may be of the type providing in Lotus Notes, available for IBM Corporation, or Outlook, available from Microsoft Corporation, the illustrative embodiments are not limited to such. Rather, the illustrative embodiments may operate in conjunction with any scheduler application that maintains a schedule of events with which lists of required personal resources may be associated. In one illustrative embodiment, the scheduler application need not be modified from currently known schedulers but the mechanisms of the illustrative embodiments use the information gathered from the schedulers to generate the lists of required personal resources upon which the illustrative embodiments operate. However, in other illustrative embodiments, the mechanisms of the illustrative embodiments may be integrated with the electronic calendar application or other scheduler application and its associated data structures.

Figure 4:
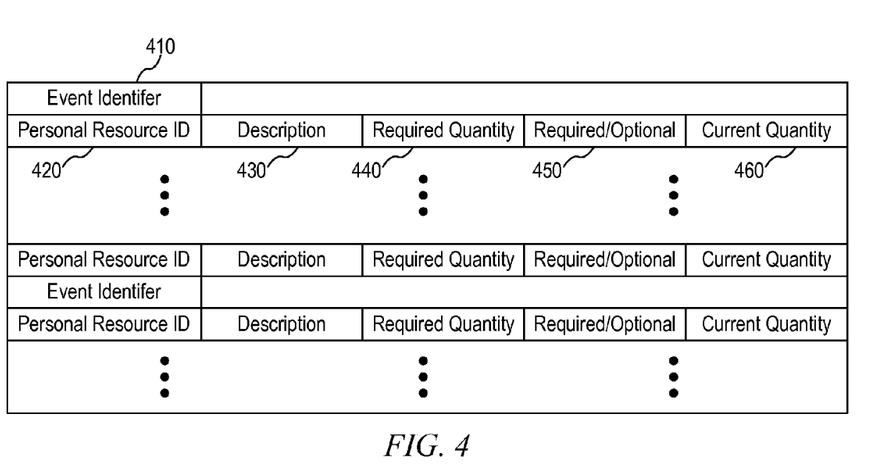
FIG. 4 is an example diagram of an event's personal resources list data structure in accordance with one illustrative embodiment.

FIG. 4 is an example diagram of an event's personal resources list data structure in accordance with one illustrative embodiment. As shown in FIG. 4, the personal resources list data structure, which may be a list of personal resources currently in the container 340, a list of required personal resources established automatically or by a user for a particular event, or a combination of both, includes a plurality of fields specifying information about personal resources that are to be taken with a user when going to a scheduled event. In the depicted example, the fields of the list data structure 400 include a field 410 for specifying an event identifier, a field 420 for specifying a personal resource identifier, a field 430 for providing a description of the personal resource, a field 440 for specifying a quantity of the personal resource, a field 450 for specifying whether the personal resource is required or optional, and a field 460 for specifying a current quantity of the personal resource present in personal resource storage containers. These fields may be populated initially based on pre-established list initial values, user input, or the like, and may be automatically and dynamically updated as the contents of containers 340 change based on the inclusion or removal of personal resource objects. For example, the values in the quantity fields 440 and 460 may be incremented or decremented according to the addition or removal of personal resource objects having the particular corresponding identifier.

Figure 5:
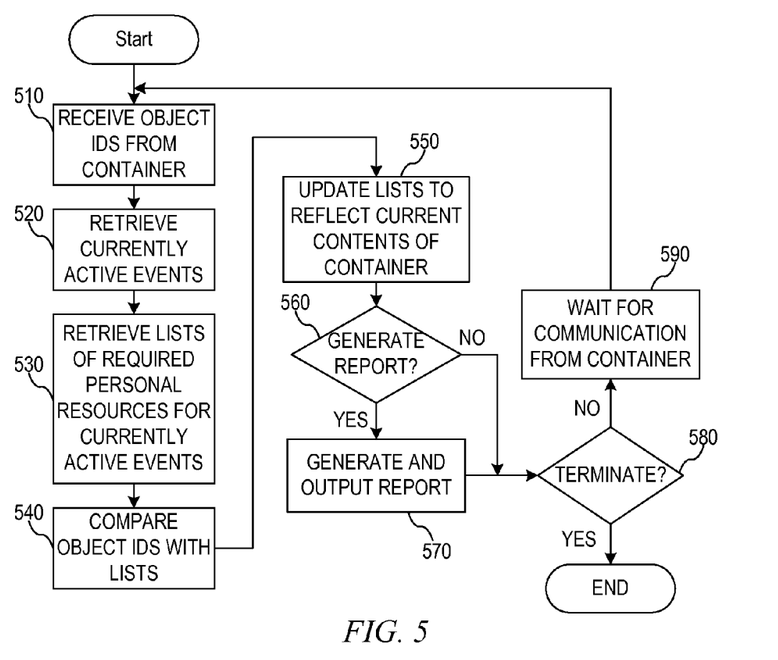
FIG. 5 is an example flowchart outlining an example operation of a personal resources organizer mechanism in accordance with the illustrative embodiments.

FIG. 5 is an example flowchart outlining an example operation of a personal resources organizer mechanism in accordance with the illustrative embodiments. As shown in FIG. 5, the operation starts by receiving identifiers of personal resource objects from a container (step 510). Currently active events are retrieved from a scheduler application (step 520). Lists of required personal resources are retrieved for the active events (step 530). The identifiers of the personal resource objects received from the container are compared against the lists (step 540) and the lists are updated to reflect the current contents of the container (step 550). A determination is made as to whether a report should be generated for the active events (step 560). If so, a report is generated and output (step 570). Thereafter, or if a report is not to be generated yet, a determination is made as to whether the operation should terminate (step 580). If the operation should terminate, i.e. a user inputs a command to terminate, the data processing system is shutdown, or any other condition that requires termination of the operation, then the operation terminates. If the operation should not terminate, the operation waits for further communication from the container (step 590) and returns to step 510.

Thus, the illustrative embodiments provide a mechanism by which a user may be informed of their readiness for particular scheduled events in their electronic calendar or other scheduler application. This readiness is measured by a correspondence between a current status of the personal resource objects the user has in their containers and a list of required personal resources for the scheduled event. Discrepancies between the current status and the list of required personal resources may be identified and the user may be alerted to these differences so that he/she can make appropriate modifications to the current status of personal resource objects, e.g., by adding additional personal resource objects, removing personal resource objects, or even modifying the list of required personal resources. In this way, a user may be more organized with regard to his/her personal resource objects and will be less likely to forget required personal resource objects when preparing for a scheduled event.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for monitoring personal resources for use with a scheduled event, comprising:
    identifying one or more personal resource objects present in a container;
    retrieving a list of required personal resource objects for an event scheduled in an electronic schedule;
    comparing the identified one or more personal resource objects with the list of required personal resource objects;
    generating a report of a readiness for the scheduled event based on results of the comparison; and
    outputting the report, wherein the one or more personal resource objects are physical objects and wherein the container is a physical container into which the one or more personal resource objects are physically placed and which houses the one or more personal resource objects.

2. The method of claim 1 wherein:
    the container comprises a reader device,
    the one or more personal resource objects comprise tags coupled to the one or more personal resource objects that are readable by the reader device, and
    identifying the one or more personal resource objects present in the container comprises reading the tags coupled to the one or more personal resource objects and providing identifier information read from the tags to the data processing system from the reader device.

3. The method of claim 2, wherein the reader device transmits the identifier information read from the tags to the data processing system via a wireless communication link.

4. The method of claim 1, wherein the list of required personal resource objects is a user defined list of required personal resource objects previously edited by a user and associated with an entry for the event in a data structure of an electronic schedule application executing on the data processing system or a different data processing system.

5. The method of claim 1, wherein the list is a pre-generated default list of personal resource objects determined based on a type of the scheduled event.

6. The method of claim 1, wherein the list is a pre-generated default list of personal resource objects determined based on a type of the scheduled event which is subsequently edited by a user to customize the list to the user.

7. The method of claim 1, wherein the scheduled event is an active event determined to be an event whose start date is within a predetermined period of a current time or an event having a reminder notification activation time within a predetermined period of a current time.

8. The method of claim 1, further comprising:
    updating a data structure associated with the list of required personal resource objects to include information about the identified one or more personal resource objects, the information about the identified one or more personal resource objects specifying at least a current number of the each of the one or more personal resource objects presently in the container.

9. The method of claim 1, wherein generating a report of readiness for the scheduled event comprises:
    identifying, for each personal resource object in the list of required personal resource objects, whether a required number of the personal resource object is present in the container;
    identifying whether there is a personal resource object in the container that is in excess of a required number for the personal resource object in the list of required personal resource objects; and
    generating the report of readiness for the scheduled event such that the report identifies which personal resource objects in the list of required personal resource objects for which a required number of the personal resource object is not present in the container, if any, and the personal resource object in the container that is in excess of the required number for the personal resource object in the list of required personal resource objects, if any.

10. The method of claim 1, wherein the method is performed for a plurality of containers.

11. A computer program product comprising a non-transitory computer recordable medium having a computer readable program recorded thereon, wherein the computer readable program, when executed on a computing device, causes the computing device to:
    identify one or more personal resource objects present in a container;
    retrieve a list of required personal resource objects for an event scheduled in an electronic schedule;
    compare the identified one or more personal resource objects with the list of required personal resource objects;
    generate a report of a readiness for the scheduled event based on results of the comparison; and
    output the report, wherein the one or more personal resource objects are physical objects and wherein the container is a physical container into which the one or more personal resource objects are physically placed and which houses the one or more personal resource objects.

12. The computer program product of claim 11, wherein:
    the container comprises a reader device,
    the one or more personal resource objects comprise tags coupled to the one or more personal resource objects that are readable by the reader device, and
    identifying the one or more personal resource objects present in the container comprises reading the tags coupled to the one or more personal resource objects and providing identifier information read from the tags to the data processing system from the reader device.

13. The computer program product of claim 12, wherein the reader device transmits the identifier information read from the tags to the data processing system via a wireless communication link.

14. The computer program product of claim 11, wherein the list of required personal resource objects is a user defined list of required personal resource objects previously edited by a user and associated with an entry for the event in a data structure of an electronic schedule application executing on the computing device or a different computing device.

15. The computer program product of claim 11, wherein the list is a pre-generated default list of personal resource objects determined based on a type of the scheduled event.

16. The computer program product of claim 11, wherein the list is a pre-generated default list of personal resource objects determined based on a type of the scheduled event which is subsequently edited by a user to customize the list to the user.

17. The computer program product of claim 11, wherein the scheduled event is an active event determined to be an event whose start date is within a predetermined period of a current time or an event having a reminder notification activation time within a predetermined period of a current time.

18. The computer program product of claim 11, wherein the computer readable program further causes the computing device to:
    update a data structure associated with the list of required personal resource objects to include information about the identified one or more personal resource objects, the information about the identified one or more personal resource objects specifying at least a current number of the each of the one or more personal resource objects presently in the container.

19. The computer program product of claim 11, wherein the computer readable program causes the computing device to generate a report of readiness for the scheduled event by:
    identifying, for each personal resource object in the of required personal resource objects, whether a required number of the personal resource object is present in the container;
    identifying whether there is a personal resource object in the container that is in excess of a required number for the personal resource object in the list of required personal resource objects; and
    generating the report of readiness for the scheduled event such that the report identifies which personal resource objects in the list of required personal resource objects for which a required number of the personal resource object is not present in the container, if any, and the personal resource object in the container that is in excess of the required number for the personal resource object in the list of required personal resource objects, if any.

20. An apparatus, comprising:
    a processor; and
    a memory coupled to the processor, wherein the memory comprises instructions which, when executed by the processor, cause the processor to:
    identify one or more personal resource objects present in a container;
    retrieve a list of required personal resource objects for an event scheduled in an electronic schedule;
    compare the identified one or more personal resource objects with the list of required personal resource objects;
    generate a report of a readiness for the scheduled event based on results of the comparison; and
    output the report, wherein the one or more personal resource objects are physical objects and wherein the container is a physical container into which the one or more personal resource objects are physically placed and which houses the one or more personal resource objects.

* * * * *